2,921,070
BASIC ESTERS OF 3-METHYLFLAVONE-8-CARBOXYLIC ACID

Paolo da Re, Milan, Italy, assignor to Recordati-Laboratorio Farmacologico S.p.A., Milan, Italy No Drawing. Application October 21, 1958
Serial No. 768,571

Claims priority, application Switzerland November 5, 1957

6 Claims. (Cl. 260—247.2)

This invention relates to novel basic ester derivatives of 3-methylflavone-8-carboxylic acid which have interesting pharmacodynamic actions. Specifically these compounds have coronary dilating, spasmolytic and papaverine-like activity. Of particular importance is the coronary dilating activity which makes these novel compounds useful agents in the treatment of angina pectoris.

The novel compounds of this invention are represented by the following general structural formula:

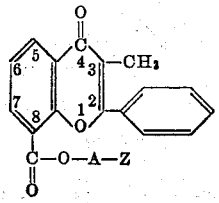

when:

A represents a divalent, straight alkylene chain containing from 2 to 3 carbon atoms, preferably ethylene or propylene and.

Z represents dimethylamino, diethylamino, di-n-propylamino, diisopropylamino, piperidino or morpholino.

An advantageous compound of this invention having marked coronary dilating activity is morpholinoethyl 3-methylflavone-8-carboxylate.

The novel compounds represented by the above formula are advantageously prepared by condensing a 3-methylflavone-8-carboxylic acid halide, preferably the acid chloride, with an aminoalcohol having the formula HO—A—Z, A and Z are as defined above. The condensation is carried out preferably by heating at reflux equipmolar amounts of the preferred acid chloride and the aminoalcohol in an anhydrous inert organic solvent, for example benzene, toluene or xylene, until the corresponding ester hydrochloride is obtained, usually for a period of from two to three hours. The solid ester hydrochloride is removed from the reaction mixture by filtration and purified by recrystallization from for example, ethanol/ether to give the product.

The ester hydrochloride prepared as described above is also converted to other nontoxic acid addition salts which are included in this invention. Thus, the hydrochloride salt in aqueous solution is neutralized with dilute alkali, extracted with for example benzene or chloroform and the extract evaporated in vacuo to yield the residual free base. The free base is then reacted by known methods with suitable nontoxic pharmaceutically acceptable organic and inorganic acids to form other addition salts. For example the base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

Alternatively, the above condensation reaction is carried out in the presence of an acid-binding agent to tie up the hydrochloric acid formed. Exemplary of suitable acid-binding agents are the alkali metal carbonates such as sodium or potassium carbonate. The free base is obtained by filtering the reaction mixture and removing the solvent, and is further treated as described above to form the acid addition salts of this invention.

The valuable intermediate, 3-methylflavone-8-carboxylic acid chloride, used as described above is readily prepared following known methods, for example by reacting the corresponding acid with thionyl chloride or phosphorus trichloride. The acid, 3-methylflavone-8-carboxylic acid, is prepared according to standard procedures for the preparation of flavones. Thus, 2-hydroxy-3-carboxypropiophenone which is prepared from 2-propionyloxybenzoic acid by heating in the presence of anhydrous aluminum chloride (Fries rearrangement conditions) is reacted with benzoic anhydride and sodium benzoate at 180–190° C. to yield the 3-methylflavone-8-carboxylic acid.

It will be obvious to one skilled in the art that the above procedures for the preparation of the basic esters of 3-methylflavone-8-carboxylic acid may be varied. Of particular advantage is the procedure whereby 3-methylflavone-8-carboxylic acid chloride is condensed with an aminoalcohol in equimolar amounts to obtain the corresponding ester hydrochloride.

The following examples illustrate the compounds of this invention and the procedures for their preparation.

Example 1

A mixture of 13.3 g. of anhydrous aluminum chloride and 100 ml. of carbon disulfide is added to 19.4 g. of 2-propionyloxybenzoic acid (prepared from the reaction of propionyl chloride and 2-hydroxybenzoic acid). After an initial evolution of hydrogen chloride, the solvent is removed by distillation and the mixture is heated at 150–160° C. for four hours. The cooled reaction mixture is treated with ice and hydrochloric acid and the product, 2-hydroxy-3-carboxypropiophenone, is obtained from the oily residue by distillation in vacuo.

A mixture of 1.9 g. of 2-hydroxy-3-carboxypropiophenone, 5.0 g. of sodium benzoate and 20.0 g. of benzoic anhydride is heated at 180–190° C. for six hours. A solution of 15.0 g. of potassium hydroxide in 50 ml. of ethanol and 20 ml. of water is added and refluxed for one hour. The mixture is evaporated and the residue after addition of water yields 3-methylflavone-8-carboxylic acid.

To a suspension of 12.0 g. of 3-methylflavone-8-carboxylic acid in 200 ml. of anhydrous benzene is added 10.0 g. of thionyl chloride. The mixture is refluxed for two hours during which the suspended solid goes into solution. The solvent is completely removed by distillation, the residue extracted with benzene and the extract evaporated to dryness. The product, 3-methylflavone-8-carboxylic acid chloride, is recrystallized from ligroin to give crystals melting at 155–156° C.

To a solution of 11.0 g. of 3-methylflavone-8-carboxylic acid chloride in 150 ml. of anhydrous benzene at room temperature is added 3.3 g. of dimethylaminoethanol and the mixture heated at reflux for 2-3 hours. The separated solid is then filtered off, washed with benzene and dried. The product, dimethylaminoethyl 3-methylflavone-8-carboxylate hydrochloride, is recrystallized from alcohol/ether, M.P. 177-178° C.

Example 2

A solution of 11.0 g. of 3-methylflavone-8-carboxylic acid chloride in 150 ml. of anhydrous benzene is treated with 4.3 g. of diethylaminoethanol at room temperature and refluxed for 2-3 hours. The separated solid is filtered, washed with benzene and dried to give diethylaminoethyl 3-methylflavone-8-carboxylate hydrochloride, M.P. 163-164° C.

An aqueous solution of the hydrochloride is neutralized with dilute sodium hydroxide, extracted with chloroform and the extract evaporated in vacuo to give the free base. An ethereal solution of the free base is treated with anhydrous hydrogen bromide gas to yield diethylaminoethyl 3-methylflavone-8-carboxylate hydrobromide.

Example 3

To 11.0 g. of 3-methylflavone-8-carboxylic acid chloride dissolved in 150 ml. of anhydrous benzene is added 5.1 g. of di-n-propylaminoethanol. The mixture is refluxed for 2-3 hours and the separated solid filtered, washed with benzene and dried to give the crystalline product, di-n-propylaminoethyl 3-methylflavone-8-carboxylate hydrochloride, M.P. 212-215° C.

Example 4

Diisopropylaminoethanol (5.1 g.) is added to 11.0 g. of 3-methylflavone-8-carboxylic acid chloride dissolved in 150 ml. of anhydrous benzene at room temperature and the mixture refluxed for 2-3 hours. The separated solid is filtered, washed with a little benzene and dried. The colorless crystalline solid, diisopropylaminoethyl 3-methylflavone-8-carboxylate hydrochloride, is recrystallized from ethyl alcohol/ether to melt at 190-192° C.

The hydrochloride in aqueous solution is neutralized with dilute sodium hydroxide solution, extracted with chloroform and the extract evaporated in vacuo to yield the residual free base. An ethyl acetate solution of the free base is treated with an ethyl acetate solution of maleic acid to give diisopropylaminoethyl 3-methylflavone-8-carboxylate maleate.

Example 5

To 11.0 g. of 3-methylflavone-8-carboxylic acid chloride dissolved in 150 ml. of anhydrous benzene is added at room temperature 4.8 g. of piperidinoethanol and the mixture refluxed for 2-3 hours. The separated solid is filtered, washed with benzene and dried. The product, piperidinoethyl 3-methylflavone-8-carboxylate hydrochloride, is obtained as a colorless crystalline solid, M.P. 232-234° C.

Example 6

To 11.0 g. of 3-methylflavone-8-carboxylic acid chloride dissolved in 150 ml. of anhydrous benzene is added 4.8 g. of morpholinoethanol at room temperature. The mixture is heated at reflux for 2-3 hours and the separated solid filtered off, washed with a little benzene and dried to give the product, morpholinoethyl 3-methylflavone-8-carboxylate hydrochloride, M.P. 233-234° C.

Example 7

To a solution of 11.0 g. of 3-methylflavone-8-carboxylic acid chloride in 150 ml. of anhydrous benzene is added 5.5 g. of dimethylaminopropanol at room temperature and the mixture refluxed for 2-3 hours. The separated solid is filtered, washed with benzene and dried. Upon recrystallization from ethyl alcohol/ether, the pure crystalline product, dimethylaminopropyl 3-methylflavone-8-carboxylate hydrochloride, is obtained, M.P. 207-210° C.

Example 8

To 11.0 g. of 3-methylflavone-3-carboxylic acid chloride dissolved in 150 ml. of anhydrous benzene is added at room temperature 5.7 g. of diethylaminopropanol and the mixture refluxed for 2-3 hours. The separated solid is filtered, washed with benzene and dried. The product, diethylaminopropyl 3-methylflavone-8-carboxylate hydrochloride, melts at 187-189° C.

The hydrochloride salt in aqueous solution is neutralized with dilute sodium hydroxide solution, extracted with chloroform and the extract evaporated in vacuo to yield the free base, diethylaminopropyl 3-methylflavone-8-carboxylate. The free base is then reacted in an ethyl acetate solution with tartaric acid to give the corresponding tartrate salt.

What is claimed is:

1. A chemical compound of the class consisting of a free base and its nontoxic acid addition salts, said free base having the formula:

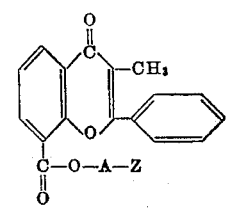

in which A is a divalent alkylene chain containing from 2 to 3 carbon atoms and Z is a member selected from the group consisting of dimethylamino, diethylamino, di-n-propylamino, diisopropylamino, piperidino and morpholino.

2. A chemical compound having the basic structural formula:

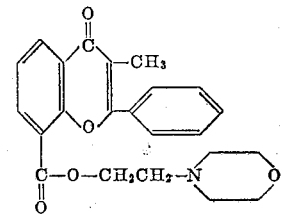

3. Morpholinoethyl 3-methylflavone-8-carboxylate hydrochloride.

4. A chemical compound having the basic structural formula:

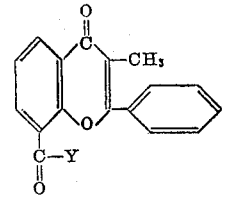

in which Y is a member selected from the group consisting of hydroxy and chlorine.

5. 3-methylflavone-8-carboxylic acid.
6. 3-methylflavone-8-carboxylic acid chloride.

References Cited in the file of this patent

UNITED STATES PATENTS 2,868,786   Siemer et al. _____ Jan. 13, 1959